(12) United States Patent
Mizuno et al.

(10) Patent No.: US 10,070,703 B2
(45) Date of Patent: Sep. 11, 2018

(54) ATTACHABLE AND DETACHABLE STRUCTURE AND PRODUCT INCLUDING THE SAME

(71) Applicant: Sony Corporation, Tokyo (JP)

(72) Inventors: Tomomasa Mizuno, Kanagawa (JP); Hidenori Ishibashi, Tokyo (JP); Fujio Kobayashi, Kanagawa (JP); Kazuhiro Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/305,493

(22) PCT Filed: Feb. 24, 2015

(86) PCT No.: PCT/JP2015/000908
§ 371 (c)(1),
(2) Date: Oct. 20, 2016

(87) PCT Pub. No.: WO2015/166614
PCT Pub. Date: Nov. 5, 2015

(65) Prior Publication Data
US 2017/0042295 A1   Feb. 16, 2017

(30) Foreign Application Priority Data

Apr. 28, 2014 (JP) ................. 2014-092914

(51) Int. Cl.
*A44B 18/00* (2006.01)
*A44B 99/00* (2010.01)
*G02C 11/00* (2006.01)

(52) U.S. Cl.
CPC .......... *A44B 18/0015* (2013.01); *A44B 99/00* (2013.01); *G02C 11/00* (2013.01)

(58) Field of Classification Search
CPC ........ G02C 11/00; B65D 35/44; B65D 35/35; B65D 35/54; E05C 19/02; E05C 19/16; H05K 5/03; A44B 18/0015; A44B 99/00
See application file for complete search history.

(56) References Cited

U.S. PATENT DOCUMENTS

| | | | |
|---|---|---|---|
| 4,426,816 A * | 1/1984 | Dean | ......... A44B 18/0069 |
| | | | 160/368.1 |
| 2005/0235462 A1* | 10/2005 | Takahashi | ......... A41F 1/00 |
| | | | 24/114.05 |
| 2009/0307869 A1 | 12/2009 | Salice | |

FOREIGN PATENT DOCUMENTS

| | | |
|---|---|---|
| JP | 1977-050007 A | 4/1977 |
| JP | 1979-102305 A | 7/1979 |

(Continued)

OTHER PUBLICATIONS

International Search Report and Written opinion and English translation thereof dated Jun. 2, 2015 in connection with International Application No. PCT/JP2015/000908.

(Continued)

*Primary Examiner* — David M Upchurch
(74) *Attorney, Agent, or Firm* — Wolf, Greenfield & Sacks, P.C.

(57) ABSTRACT

[Object]
[Solving Means] An attachable and detachable structure includes a superficial part and a base. The superficial part has an attachment part and a non-attachment part. The base supports the superficial part and moves one of the attachment part and the non-attachment part forward or backward to the other.

10 Claims, 5 Drawing Sheets

(56) References Cited

FOREIGN PATENT DOCUMENTS

| | | |
|---|---|---|
| JP | 1988-167904 A | 11/1988 |
| JP | 2003-259904 A | 9/2003 |
| JP | 2004-188004 A | 7/2004 |
| JP | 2010-502868 A | 1/2010 |

OTHER PUBLICATIONS

International Preliminary Report on Patentability and English translation thereof dated Nov. 10, 2016 in connection with International Application No. PCT/JP2015/000908.

* cited by examiner

H : Height of hook
T : Thickness of hook
θ : Curvature angle of hook
α : Slope of hook
β : Angle of head m : Length of pipe
r : Inner diameter of pipe
R : Diameter of reservoir of lubricant oil

… (1) …

ATTACHABLE AND DETACHABLE STRUCTURE AND PRODUCT INCLUDING THE SAME

TECHNICAL FIELD

The present technology relates to the attachable and detachable structure, and an apparatus, a device, and other product including the attachable and detachable structure.

BACKGROUND ART

For example, as a structure of wearing a wearable apparatus, e.g., a head mount type apparatus, a spectacle frame is often used (for example, see Patent Document 1). Other than the head mount type wearable apparatus, a wrist band type, i.e., a clock type apparatus is also proposed (for example, see Patent Document 2), and some apparatuses are already distributed on the market.

Patent Document 1: Japanese Patent Application Laid-open No. 2013-88725
Patent Document 2: Japanese Patent Application Laid-open No. 2013-140158

SUMMARY OF INVENTION

Problem to be Solved by the Invention

However, such a wearable apparatus requires a structure behind an ear or a structure wrapping around an arm, and the shape of the apparatus inevitably depends on the structure.

Accordingly, an object of the present technology is to provide an attachable and detachable structure that has less or no limitations for attachment and detachment and a product including the same.

Means for Solving the Problem

In order to achieve the object, the attachable and detachable structure according to the present technology includes a superficial part and a base.

The superficial part has an attachment part and a non-attachment part.

The base supports the superficial part and moves one of the attachment part and the non-attachment part forward or backward to the other.

As the superficial part has the attachment part and the non-attachment part, the shape of the superficial part for attachment and detachment has less or no limitations. In the base supporting the superficial part, as one of the attachment part and the non-attachment part moves forward or backward to the other, the attachable and detachable structure can be achieved.

The base may drive correspondingly the attachment part and the non-attachment part by applying a compressive force or a tensile force to the base.

In this manner, for example, a user picks or pulls the base, thereby achieving the attachment and detachment of the superficial part.

The base may include a fixed layer that supports the attachment part, and a movable layer that supports the non-attachment part.

The movable layer may include a first movable part and a second movable part.

The first movable part is configured to support the non-attachment part. At least both ends of the first movable part are sandwiched by the fixed layers.

The second movable part is configured to be positioned deeper than the first movable part and disposed continuously from the first movable part.

The second movable part may spread from the first movable part.

By applying the compressive force to the base, the first movable part can protrude from the fixed layer.

The movable layer may be made of a material having a Young's modulus lower than that of the fixed layer.

The attachment part may include a plurality of hooks.

In this manner, the attachment part has a function of a hook-and-loop fastener, which allows easy attachment and detachment of the superficial part.

At least one head of the plurality of hooks may have a cone or pyramid shape.

In this manner, the subject to be attached is attached with certainty.

Directions of heads of the plurality of hooks may be two or more.

The superficial layer may include a plurality of non-attachment parts.

The attachment part may include a plurality of regions that are provided by partitioning the surface of the base and a plurality of hooks disposed on the plurality of regions. In addition, directions of heads of the hooks may be different per regions partitioned.

In this manner, a variety of the attachable and detachable structures having a plurality of directions of the heads of the hooks can be achieved.

The base may include a surface that configures the surface of the non-attachment part, and a holder for holding a lubricant material that is formed by opening the surface.

In this manner, the lubricant material is supplied from the non-attachment part to between the non-attachment part and the subject to be attached, thereby lubricating the non-attachment part which allows easy detachment.

The attachable and detachable structure is applicable to a variety of machines, devices, tools, electronic apparatuses and the like.

Effects of the Invention

As above, according to the present technology, it can achieve an attachable and detachable structure that has less or no limitations for attachment and detachment.

It should be noted that the effect described here is not necessarily limitative and may be any effect described in the present disclosure.

MODES FOR CARRYING OUT THE INVENTION

Hereinafter, embodiments according to the present technology will be described with reference to the drawings.

1. First Embodiment

1) Configuration of Attachable and Detachable Structure

Figure 1:
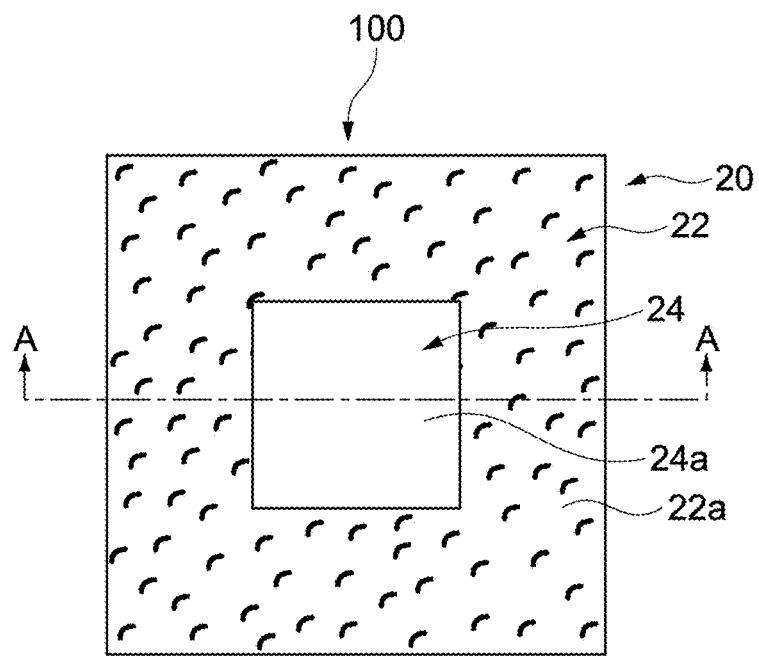
FIG. 1 is a plan view schematically showing an attachable and detachable structure according to a first embodiment of the present technology.
Figure 2:
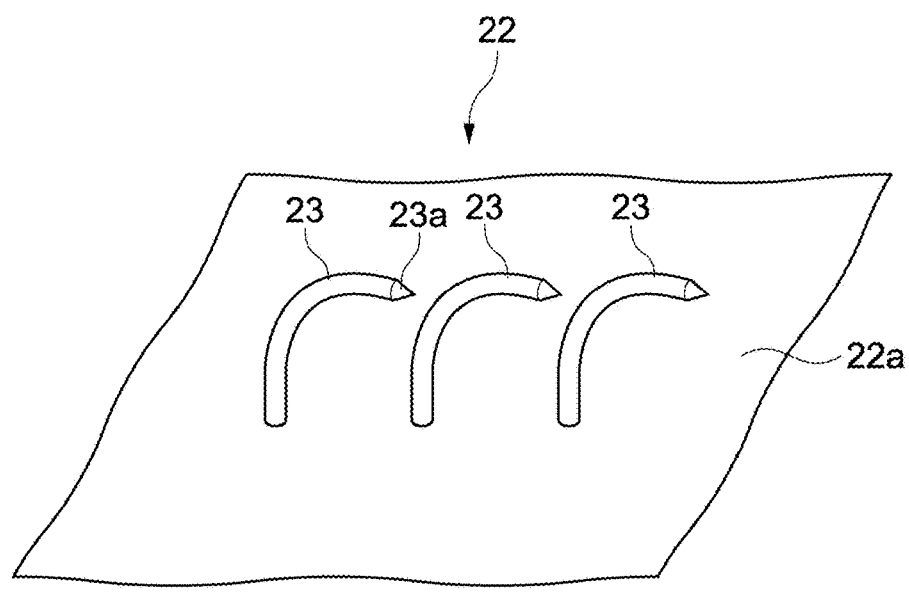
FIG. 2 is a perspective view schematically and enlargedly showing a superficial part of the attachable and detachable structure shown in FIG. 1.
Figure 3:
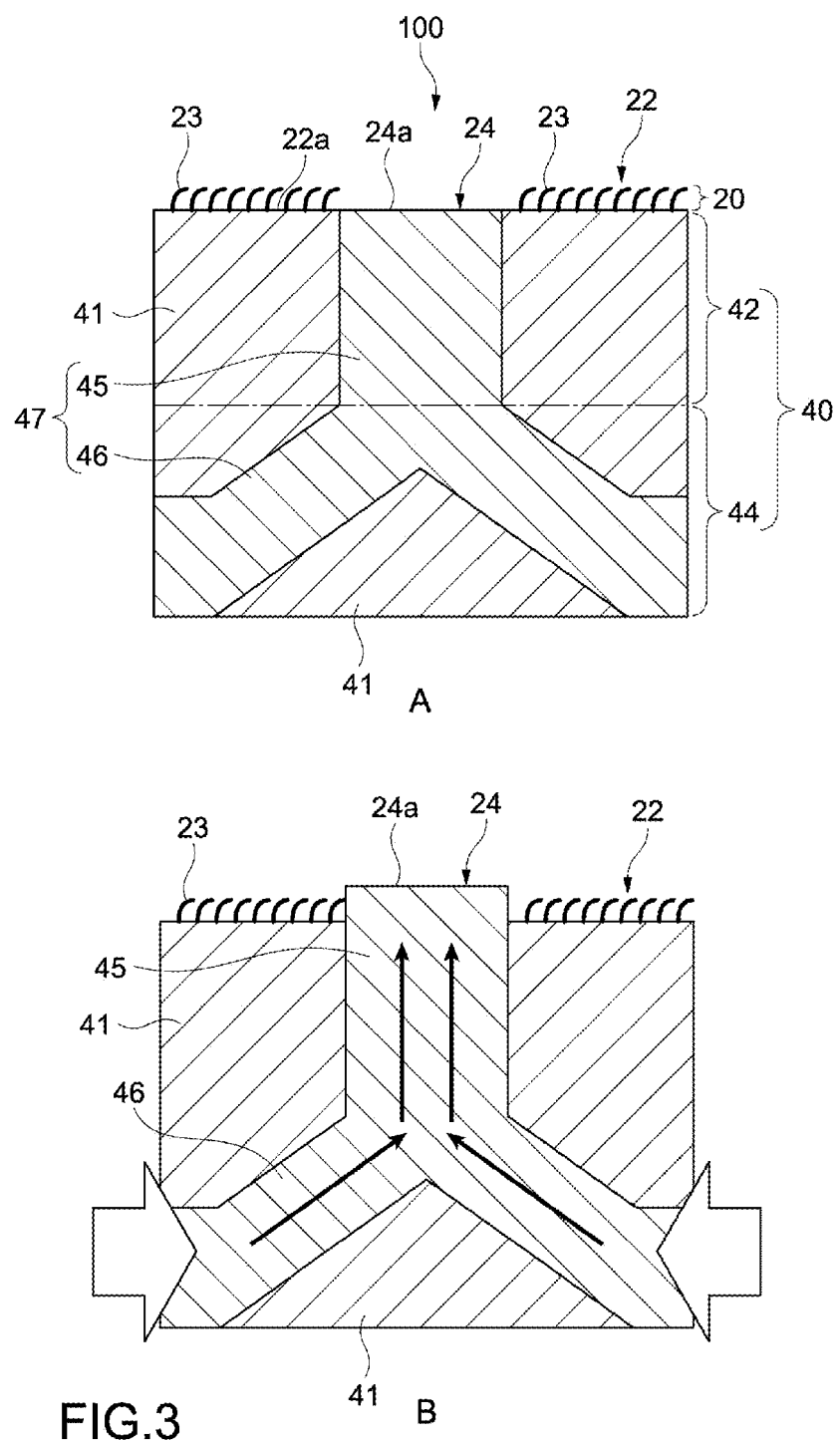
FIG. 3A is an A-A line cross-sectional view of FIG. 1.
FIG. 3B shows a state that a movable layer is driven.

FIG. 1 is a plan view schematically showing an attachable and detachable structure according to a first embodiment of the present technology. FIG. 2 is a perspective view schematically and enlargedly showing a superficial part 20 of an attachable and detachable structure 100 shown in FIG. 1. FIG. 3A is an A-A line cross-sectional view of FIG. 1.

The attachable and detachable structure 100 includes the superficial part 20, and a base 40 supporting the superficial part 20. The superficial part 20 includes an attachment part 22 and a non-attachment part 24. The superficial part 20 is an upper area in the figure from a surface 22a of the base 40 in the attachable and detachable structure 100. The attachment part 22 includes a plurality of hooks 23 protruded from the surface 22a of the base 40. In the non-attachment part 24, no hook 23 is provided, and a surface 24a of the base 40 is exposed. Hereinafter, for convenience of explanation, the surface of the base 40 corresponding to the attachment part 22 refers to a "attachment surface" 22a, the surface of the base 40 corresponding to the non-attachment part 24 refers to a "non-attachment surface" 24a.

For example, when the attachable and detachable structure 100 is in a non-driven state, the attachment surface 22a is flush with the non-attachment surface 24a. Alternatively, in the non-driven state, when the non-attachment surface 24a is lower than heads of the hooks 23 in the figure, they may not be flush.

The base 40 is configured such that one of the attachment part 22 and the non-attachment part 24 moves forward or backward to the other. In this embodiment, it is configured that once a compressive force is applied to the base 40, the non-attachment part 24 (the non-attachment surface 24a) protrudes from the attachment part 22 (see the driven state in FIG. 3B).

For example, the base 40 includes a fixed layer 41 supporting the attachment part 22 (that is to say, a plurality of hooks 23), and the movable layer 47 supporting the non-attachment part 24. The movable layer 47 includes a movable part at the superficial layer side (a first movable part) 45 disposed at a superficial layer region 42 of the base 40, and a movable part at a deep layer side (a second movable part) 46 disposed at a deep layer side region 44 that is positioned deeper.

At least both ends of the movable part at the superficial layer side 45 are sandwiched by the fixed layers 41. For example, the movable part at the superficial layer side 45 is disposed such that the attachment part 22 surrounds the non-attachment part 24, as shown in FIG. 1. The attachment part 22 configures a hook-and-loop fastener.

As shown in FIG. 3A, the movable part at the deep layer side 46 is disposed continuously and spreads from the movable part at the superficial layer side 45. The movable part at the deep layer side 46 is in a conical, radial, or similar three-dimensional shape, for example.

For example, there may be a gap between the movable part at the superficial layer side 45 and the fixed layer 41. The gap may be about 1 μm.

FIG. 2 is a perspective view enlargedly showing the hooks 23 of the attachment part 22. Each hook 23 has a curved columnar shape, for example, and a head 23a thereof has a cone shape, for example. The hook 23 may have a curved square pillar shape, and the head 23a may have a pyramid shape.

The attachment surface 22a shown in FIG. 1 may include more hooks 23. Alternatively, the number of the hooks per unit area may be greater. In addition, a two-dimensional arrangement of the hooks 23 and directions of the heads may be regular or random.

Figure 4:
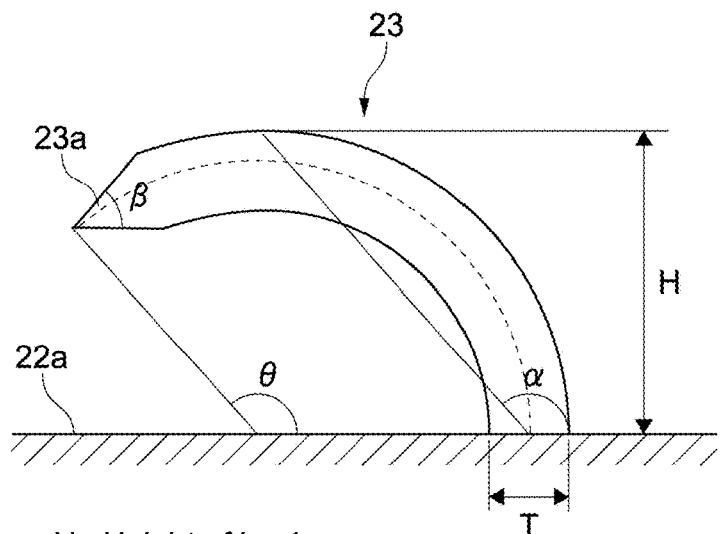
FIG. 4 is a view showing a configuration example of a hook.

FIG. 4 is a view showing a configuration example of the hook 23. An example size of the hook 23 is as follows:

Height H: 50 μm to 5 mm
Thickness T: 10 μm to 1 mm
Curvature angle $\theta$: 50° to 150°
Slope angle $\alpha$: 110° to 155°
Angle of head $\beta$: 40° to 80°

For example, when a subject (not shown) to which the attachable and detachable structure is attached (hereinafter referred to as "subject to be attached") is a cloth, a thickness of fibers such as thicker ones of wool and silk of the cloth is about 50 μm. Accordingly, 50 μm or more of the height H may be sufficient. An upper limit of the thickness is set to 5 mm within a range that does not affect appearance (JIS P 8208).

The head 23a is excluded from the thickness T. The thickness T is represented by an average value, a maximum value or a minimum value. A lower limit of the thickness T is about 15 μm that is a thickness of a mosquito's needle, and is here set to 10 μm. As a real upper limit, 1 mm is selected.

When a curved part of the hook 23 is arc, for example, the curvature angle $\theta$ is an angle at circle center of the arc. The arc passes through the center of the hook 23 shown by a dashed line. The hook 23 shown in FIG. 4 has the circle center positioned within the attachment surface 22a, and an arc shape toward the head. That is to say, FIG. 4 shows an example that an overall shape is the arc. It should be appreciated that the circle center may be outside of the attachment surface 22a, and a root of the hook may protrude straightly from the attachment surface 22a and may be curved arc from a predetermined height.

The curvature angle $\theta$ is set to, for example, 50° to 150°, or 80° to 120°, for example, 90°. In this way, when the subject to be attached is fibers, the hook 23 can be caught by the fibers.

The slope angle $\alpha$ of the hook 23 is an angle against the attachment surface 22a from a center of the root of the hook 23 to a maximum height (H). The slope angle $\alpha$ is set to 110° to 155°, for example. If the slope angle $\alpha$ exceeds 155°, the hooks less catch the subject to be attached, e.g., loop fibers, for example. If the slope angle $\alpha$ is lower than 110°, the hooks that are caught by the subject to be attached, e.g., loop fibers, are easily loosened, for example. In other words, if the slope angle $\alpha$ is not within the defined range, the hook is not adequately engaged with the loop fibers. The slope angle $\alpha$ is more preferably 120° to 150°.

The angle $\beta$ of the head 23a is set to 40° to 80°, e.g., 60° so that a force that pierces the subject to be attached is dispersed. However, the head 23a of the hook may not be pointed sharply, and may be rectangular or curved surface.

The shape and the size of the hook 23 described above are only illustrative, and may be changed depending on the structure of the subject to be attached. Desirably, the hook 23 may have an elastic force against the subject to be attached, e.g., fibers, and may have the size and the shape therefor. In order to achieve this, materials described later are used.

The movable layer 47 is made of a material having a Young's modulus lower than that of the fixed layer 41. In other words, in order to drive the movable layer 47 to the fixed layer 41, the movable layer 47 is made of the material softer than that of the fixed layer 41. The movable layer 47 is made of rubber, and the fixed layer 41 is made of resin, for example.

Both of the movable layer 47 and the fixed layer 41 may be made of resin. As the resin, PEEK, PC, PMMA, POM, PU, PET, PA, PCTFE, PTFE, FEP, PFA, ETFE, PVDF, soft PVC, PVA, ABS, PP, PMMAPS or the like may be selectively used. For example, the material having a relatively high Young's modulus includes POM and ABS. The material having a relatively low Young's modulus includes PP and PTFE.

The material of the hook 23 is typically made of the above-described resin materials. Desirable materials of the hook 23 include nylon+PP (synthetic of nylon and PP), PC, PE, POM or the like.

The attachable and detachable structure 100 configured as described above is formed by an injection molding apparatus (not shown) or a 3D printer (molding apparatus), for example. The molding apparatuses described in, for example, Japanese Patent Application Laid-open No. 2012-040757, Japanese Patent Application Laid-open No. 2012-106437, Japanese Patent Application Laid-open No. 2012-240216, Japanese Patent Application Laid-open No. 2013-207060, Japanese Patent Application Laid-open No. 2013-059983 can be used.

The attachable and detachable structure 100 is formed by injection molding, e.g., multicolor molding, in-mold molding or the like. By the molding, the fixed layer 41 and the movable layer 47 of the base 40 can be formed.

When the molding apparatus is used for forming at least the base 40, a different plurality of resin materials can be used for molding by using the molding apparatus described in eighth and ninth embodiments of Japanese Patent Application Laid-open No. 2012-040757.

The base 40 and the attachment part 22 may be formed in different steps, and thereafter a sheet type attachment part having hooks 23 may be joined to the surface corresponding to the attachment part 22 of the base 40. As a joining method, an adhesive agent and ultrasonic bonding are used.

Alternatively, while the base 40 is formed by injection molding, the above-described sheet type attachment part 22 having hooks 23 may be formed by the molding apparatus.

For example, the molding by the molding apparatus described in Japanese Patent Application Laid-open No. 2013-059983 is repeated to laminate sheet type molded products, thereby forming the above-described sheet type attachment part 22 having hooks 23.

When the molding apparatus is used, the fixed layer 41 of the base 40 may be formed by photo-curing resin, and the movable layer 47 made of rubber may be formed by flowing a material such as rubber into a path (space where the movable layer 4 is to be formed) in the fixed layer 41.

2) Operation of Attachable and Detachable Structure

When the attachable and detachable structure 100 configured as described above is used, a user presses an apparatus, a machine, a device or a tool (not shown) having the attachable and detachable structure 100 thereon (hereinafter referred simply as "a product including the attachable and detachable structure") to the subject to be attached. In this manner, by a function of the hook-and-loop fastener of the attachment part 22 having the hooks 23, the product having the attachable and detachable structure 100 is attached to the subject to be attached having a fibrous surface.

As shown in FIG. 3B, user's fingers apply directly or indirectly, for example, the compressive force to a direction in parallel or substantially parallel with the surface of the base 40. In particular, the compressive force is applied to the movable layer 47. Depending on the size of the attachable and detachable structure 100, the user pinches the attachable and detachable structure 100 with fingers to apply the compressive force. When the compressive force is applied, the movable part at the deep layer side 46 in the movable layer 47 is mainly elastically deformed, and the movable part at the superficial layer side 45 is pushed by the movable part at the deep layer side 46 and moves. Then, the non-attachment surface 24a protrudes from the attachment part 22 to act to push the subject to be attached. In this manner, the hooks 23 are disengaged from the subject to be attached.

In particular, as the movable part at the deep layer side 46 spreads conically or radially from the movable part at the superficial layer side 45, not only the compressive force, but also the elastic force applied at the movable part at the deep layer side 46 are easily transmitted to the movable part at the superficial layer side 45, and the movable part at the superficial layer side 45 easily moves to an upper direction in the figure. As a result, the movable part at the superficial layer side 45 can protrude from the attachment part 22 with certainty.

Once applying the compressive force by the user is stopped, the attachable and detachable structure 100 returns to the original shape by the elastic force of the movable layer 47, and the non-attachment surface 24a returns to the original position (see FIG. 3A).

By adequately designing an area ratio of the attachment surface 22a and the non-attachment surface 24a, a density of the hooks 23 or the like, the operation of attachment and detachment can be achieved.

3) Summary

In the attachable and detachable structure 100 according to the embodiment, as the superficial part 20 includes the attachment part 22 and the non-attachment part 24, the shape of the superficial part 20 for attachment and detachment has less or no limitations. In addition, as the base 40 moves such that one of the attachment part 22 and the non-attachment part 24 moves forward or backward to the other, the attachable and detachable structure can be achieved.

As the attachable and detachable structure 100 according to the embodiment has the hooks 23, the function of the hook-and-loop fastener can be exerted on the attachment part 22, which allows easy attachment.

As each heads 23a of the hooks 23 in the attachable and detachable structure 100 has a cone or pyramid shape, the heads 23a easily pierce the subject to be attached, and the attachable and detachable structure 100 can be attached to the subject to be attached with certainty.

The attachable and detachable structure 100 according to the embodiment has a rectangular shape in a planar view as shown in FIG. 1, for example, but is not limited thereto, and may have any shape such as a circle and an oval. In the planar view as shown in FIG. 1, the attachment part 22 may be formed polygonal, and the non-attachment part 24 may formed circle or oval, and vice versa.

The cross-sectional shape of the attachable and detachable structure 100 shown in FIG. 3A is not limited thereto, but any shape is applicable thereto.

2. Second Embodiment

Figure 5:
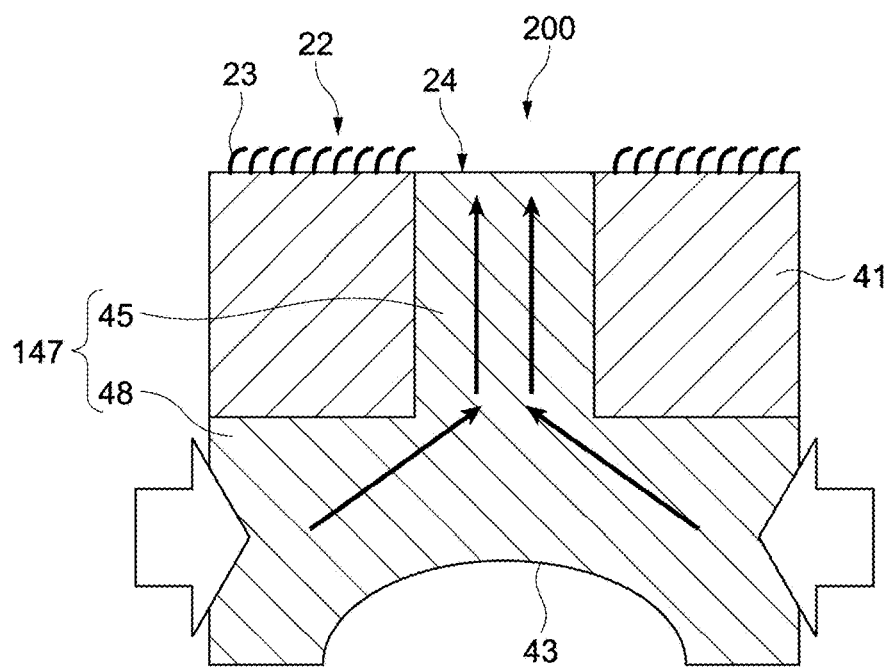
FIG. 5 is a cross sectional view schematically showing an attachable and detachable structure according to a second embodiment of the present technology.

FIG. 5 is a cross sectional view schematically showing an attachable and detachable structure according to a second embodiment of the present technology. In the following description, components substantially similar to the members and functions in the attachable and detachable structure 100 according to the embodiment shown in FIG. 1, etc. are denoted by the same reference numerals, detailed description thereof will be hereinafter omitted, and only different points will be mainly described.

The movable layer 147 of an attachable and detachable structure 200 shown in FIG. 5 includes the movable part at the superficial layer side 45 and the movable part at the deep layer side 48 that spreads from the movable part at the superficial layer side 45 in a horizontal direction. A hollow (or notch) 43 is disposed at the movable part at the deep layer side 48 opposite to the movable part at the superficial layer side 45, for example. By disposing the hollow 43 at this position, the elastic force of the movable part at the deep layer side 48 is easily transmitted to the movable part at the superficial layer side 45, and the movable part at the superficial layer side 45 is driven with certainty.

3. Third Embodiment

Figure 6:
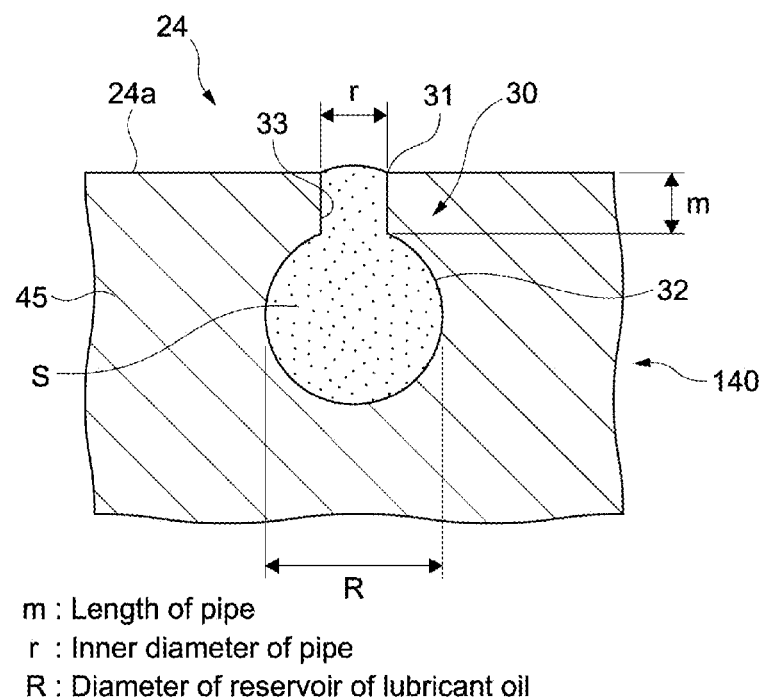
FIG. 6 is a cross sectional view schematically showing a configuration of a holder of a lubricant material in an attachable and detachable structure according to a third embodiment of the present technology.

FIG. 6 is an attachable and detachable structure according to a third embodiment of the present technology, and is a cross sectional view schematically and enlargedly showing the non-attachment surface 24a. The base 140 includes a holder 30 for holding a lubricant material S that is formed by opening the non-attachment surface 24a at the non-attachment part 24. One or a plurality of holders 30 are provided. When a plurality of holders 30 are provided, the plurality of holders 30 function as a porous part.

The holder 30 includes a reservoir 32 of the lubricant material S and a pipe 33 for communicating the reservoir 32 with an opening 31, for example. In the below, design criteria of the holder 30 are shown.

Inner diameter r of pipe 33: a desirable value of r is that satisfies the following equation (1) of capillary phenomenon to the lubricant material S used, or the value is not more than r.

Diameter of reservoir 32 (or volume equivalent diameter) R: a desirable value is greater than the inner diameter r of the pipe 33.

Length m of pipe 33: not especially limited.

$$h = (2T \cos \theta)/\rho g r \quad \text{equation (1)}$$

h: increased height of liquid surface
T: surface tension
θ: contact angle
ρ: density of lubricant material S
g: acceleration of gravity
r: inner diameter of pipe As the lubricant material S, lubricant oils such as silicone oil, vegetable oil, animal oil, and general grease are used.

When the plurality of holders 30 are disposed, a two-dimensional arrangement may be any of matrix, zigzag, random and the like.

As the attachable and detachable structure according to the embodiment has holder 30, the lubricant material S is supplied from the non-attachment part 24 to between the non-attachment part 24 and the subject to be attached, thereby lubricating the non-attachment part 24 which allows easy detachment.

4. Fourth Embodiment

Figure 7:
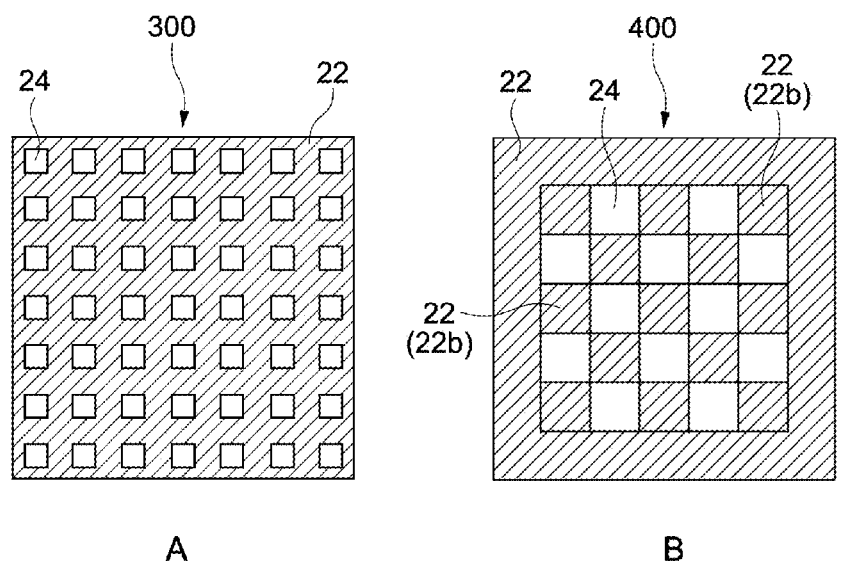
FIG. 7A, B are planar views of an attachable and detachable structure according to a fourth embodiment.

FIGS. 7A and B are planar views of an attachable and detachable structure according to a fourth embodiment. An attachable and detachable structure 300 according to the embodiment shown in FIG. 7A is configured of the attachable and detachable structures 100 shown in FIG. 1 arranged in a matrix. Specifically, a hatched region is the attachment part 22, a plurality of non-attachment parts 24 in white are disposed within the attachment part 22. The movable layers 47 supporting the non-attachment parts 24 may be linked within the bases 40.

An attachable and detachable structure 400 shown in FIG. 7B includes the attachment part 22 and the non-attachment parts 24 arranged in a checkboard pattern. Hatched regions (including a peripheral square-shaped frame) are the attachment part 22, white regions are the non-attachment parts 24. A boundary between the frame attachment part 22 and each attachment part 22 (22b) at periphery of the checkboard pattern may not be provided.

The attachable and detachable structure 400 shown in FIG. 7B includes the square-shaped attachment part 22 and the non-attachment parts 24. The shapes of the attachment part and the non-attachment parts may be triangle, honeycomb and other polygonal shapes. The shapes of the attachment part and the non-attachment parts may be different.

In the embodiment shown in FIGS. 7A and B, the non-attachment parts 24 are scattered uniformly, thereby easily disengaging the hooks 23 from the subject to be attached.

5. Fifth Embodiment

Figure 8:
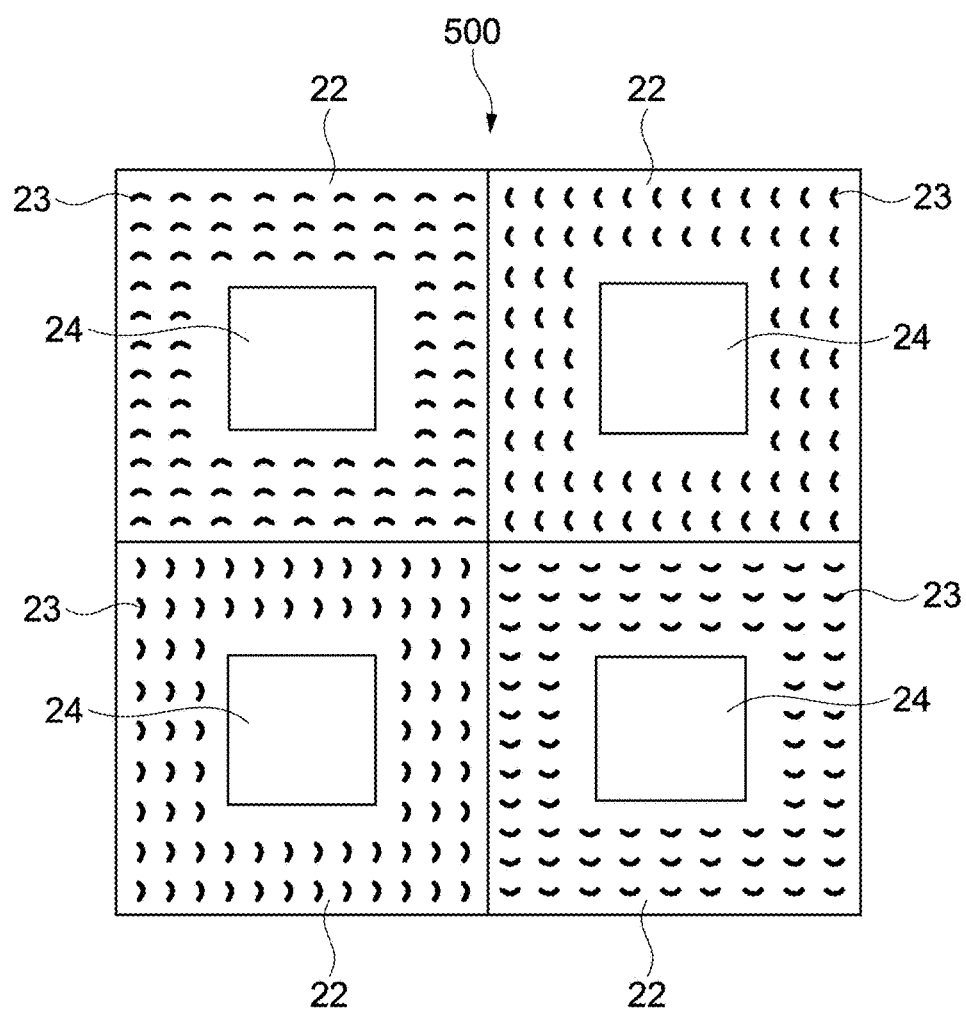
FIG. 8 is a planar view of an attachable and detachable structure according to a fifth embodiment.

FIG. 8 is a planar view of an attachable and detachable structure according to a fifth embodiment. In this embodiment, directions of the hooks 23 of the attachment parts 22 partitioned in a plurality of regions (directions of heads of the hooks 23) are different in each region. An attachable and detachable structure 500 according to this embodiment includes four regions and four directions of the hooks 23. It should be appreciated that the number of partitions is not limited to four, and may be two (the directions of the hooks are two) or five or more (the directions of the hooks are five or more). Alternatively, the number of partitions and the number of the directions of the hooks 23 may not be the same. Clear lines shown in the figure are unnecessary at boundaries of the "partitions".

By such a configuration, a variety of the attachable and detachable structures having a plurality of directions of the heads of the hooks 23 can be achieved.

When a product having the attachable and detachable structure is attached to the subject to be attached and used in one direction, the attachable and detachable structure may only include the hooks 23 formed in one direction.

6. Examples of Product Having Attachable and Detachable Structure

Examples of a product having the attachable and detachable structure 100 are as follows (not shown):

The product is, for example, a lifelog camera, a clock, a microphone, a predometer, a portable phone, other portable apparatus, a mask, eye glasses, a hearing aid, an identification card such as an employee ID card.

7. Other Various Embodiments

The present technology is not limited to the above-described embodiments, and variations and modifications may be achieved.

The above-described embodiment describes the attachable and detachable structure having the protruded non-attachment part 24 by applying the compressive force to the base 40. It is also achievable that the movable layer is elastically deformed by applying a tensile force to the base, i.e., by pulling the base. In this case, the attachable and detachable structure has a configuration that the movable layer supports the attachment part, and the fixed layer supports the non-attachment part. By applying the tensile force to the movable layer, the attachable and detachable structure has a configuration that the attachment part supported by the movable layer migrates to inside of the base so as to correspondingly protrude the non-attachment part supported by the fixed layer.

Alternatively, a material that is elongated by applying the tensile force to the base may be used as the material of the movable layer. Such a material may be an auxetic material, for example. The auxetic material may be provided by assembling a number of three-dimensional shapes such as a wave dissipating block formed in a micro level, for example.

Alternatively, a material that elastically deforms the movable layer 47 by turning on electricity to the movable layer 47 may be used for the movable layer 47. Examples of the material include a piezo-electric device, a bimetal, a conductive polymer and the like.

A space may be provided between the movable part at the superficial layer side and the movable part at the deep layer side, and a spring may be disposed in the space. That is to say, the spring is disposed between the movable part at the superficial layer side and the movable part at the deep layer side. The spring is typically a coil spring, but may be a flat spring. In this cases, the molding apparatus can form at least the movable layer including the movable part at the deep layer side, the spring, and the movable part at the superficial layer side.

The attachment part 22 of the attachable and detachable structure according to the above-described embodiments includes a plurality of hooks 23, but may instead include an adhesive layer on the surface of the base. The adhesive layer is configured of adhesive rubber, adhesive resin, an adhesive tape, etc., for example. In this case, the attachable and detachable structure is desirably applied to a usage that the attachable and detachable structure is directly adhered to a human skin.

For example, when a plurality of electronic apparatuses each having the attachable and detachable structure are directly attached to a human body and the electronic apparatuses are mutually communicated, a communication system may be wireless LAN, Bluetooth, infrared, as well as intra-body communication.

In the base of the attachable and detachable structure according to the above-described embodiments, a lubricant material may be filled between the movable layer and the fixed layer.

It is also possible to combine at least two features of the above-described features of the embodiments.

The present disclosure may have the following configurations.

(1) An attachable and detachable structure, including:
a superficial part having an attachment part and a non-attachment part, and
a base that supports the superficial part and moves one of the attachment part and the non-attachment part forward or backward to the other.

(2) The attachable and detachable structure according to (1) above, in which
the base drives correspondingly the attachment part and the non-attachment part by applying a compressive force or a tensile force to the base.

(3) The attachable and detachable structure according to (2) above, in which
the base includes
a fixed layer that supports the attachment part, and
a movable layer that supports the non-attachment part.

(4) The attachable and detachable structure according to (2) above, in which
the movable layer includes
a first movable part that supports the non-attached part, at least both ends of the movable layer being sandwiched by the fixed layers, and
a second movable part positioned deeper than the first movable part and disposed continuously from the first movable part.

(5) The attachable and detachable structure according to (4) above, in which
the second movable part spreads from the first movable part.

(6) The attachable and detachable structure according to any one of (1) to (5) above, in which
the movable layer is made of a material having a Young's modulus lower than that of the fixed layer.

(7) The attachable and detachable structure according to any one of (1) to (6) above, in which
the attachment part includes a plurality of hooks.

(8) The attachable and detachable structure according to (7) above, in which
at least one head of the plurality of hooks has a cone or pyramid shape.

(9) The attachable and detachable structure according to (7) or (8) above, in which
directions of heads of the plurality of hooks are two or more.

(10) The attachable and detachable structure according to any one of (6) to (9) above, in which
the superficial layer includes a plurality of non-attachment parts.

(11) The attachable and detachable structure according to any one of (1) to (9) above, in which
the attachment part includes a plurality of regions that are provided by partitioning the surface of the base and a plurality of hooks disposed on the plurality of regions, and
directions of the heads of the hooks are different per regions.

(12) (1) The attachable and detachable structure according to any one of (1) to (11) above, in which
the base includes
a surface that configures the surface of the non-attachment part, and
a holder for holding a lubricant material that is formed by opening the surface.

(13) A product having an attachable and detachable structure, including:

a superficial part having an attachment part and a non-attachment part, and a base that supports the superficial part and moves one of the attachment part and the non-attachment part forward or backward to the other.

DESCRIPTION OF SYMBOLS 20 superficial part
22 attachment part
23 hook
23a head
24 non-attachment part
30 holder
40, 140 base
41 fixed layer
45 movable part at superficial layer side
46, 48 movable part at deep layer side
47, 147 movable layer
48 movable part at deep layer side
100, 200, 300, 400, 500 attachable and detachable structure

The invention claimed is:

1. An attachable and detachable structure, comprising:
a superficial part having an attachment part and a non-attachment part, and
a base that supports the superficial part and moves one of the attachment part and the non-attachment part forward or backward to the other;
the base includes
a fixed layer that supports the attachment part, and
a movable layer that supports the non-attachment part,
wherein the base drives correspondingly the attachment part and the non-attachment part by applying a compressive force or a tensile force to the base.

2. The attachable and detachable structure according to claim 1, wherein
the movable layer includes
a first movable part that supports the non-attached part, at least both ends of the movable layer being sandwiched by the fixed layers, and
a second movable part positioned deeper than the first movable part and disposed continuously from the first movable part.

3. The attachable and detachable structure according to claim 2, wherein
the second movable part spreads from the first movable part.

4. The attachable and detachable structure according to claim 1, wherein
the movable layer is made of a material having a Young's modulus lower than that of the fixed layer.

5. The attachable and detachable structure according to claim 1, wherein
the attachment part includes a plurality of hooks.

6. The attachable and detachable structure according to claim 5, wherein
at least one head of the plurality of hooks has a cone or pyramid shape.

7. The attachable and detachable structure according to claim 5, wherein
the heads of the plurality of hooks are oriented in two or more directions.

8. The attachable and detachable structure according to claim 4, wherein
the superficial part includes a plurality of non-attachment parts.

9. The attachable and detachable structure according to claim 1, wherein
the attachment part includes a plurality of regions that are provided by partitioning a surface of the base and a plurality of hooks disposed on the plurality of regions, and
heads of the hooks are oriented in different directions in each of the plurality of regions.

10. The attachable and detachable structure according to claim 1, wherein
the base includes
a holder that is formed by opening a surface of the non-attachment part for holding a lubricant material.

* * * * *